United States Patent
Fontijn (10) Patent No.: US 7,324,415 B2
(45) Date of Patent: Jan. 29, 2008

(54) STORING CONTROL INFORMATION USING SPACERS

(75) Inventor: Wilhelmus Franciscus Johannes Fontijn, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 210 days.

(21) Appl. No.: 10/534,322

(22) PCT Filed: Oct. 20, 2003

(86) PCT No.: PCT/IB03/04618

§ 371 (c)(1), (2), (4) Date: May 9, 2005

(87) PCT Pub. No.: WO2004/044903

PCT Pub. Date: May 27, 2004

(65) Prior Publication Data

US 2006/0109764 A1 May 25, 2006

(30) Foreign Application Priority Data

Nov. 12, 2002 (EP) .................................. 02079735

(51) Int. Cl.
*G11B 5/09* (2006.01)
(52) U.S. Cl. ................. 369/47.15; 369/53.2; 369/53.44

(58) Field of Classification Search ..................... None
See application file for complete search history.

(56) References Cited

U.S. PATENT DOCUMENTS

| 4,796,098 A | 1/1989 | Giddings |
| 4,797,752 A | 1/1989 | Giddings |
| 5,646,932 A * | 7/1997 | Kuribayashi et al. .... 369/275.3 |
| 2002/0027868 A1* | 3/2002 | Hayashi et al. .......... 369/275.3 |

FOREIGN PATENT DOCUMENTS

| EP | 0430482 A2 | 6/1991 |
| EP | 0430482 B1 | 6/1991 |
| EP | 0512643 A2 | 11/1992 |
| EP | 0512643 B1 | 11/1992 |
| EP | 0944088 A2 | 9/1999 |
| EP | 0944088 B1 | 9/1999 |

* cited by examiner

*Primary Examiner*—Muhammad Edun
(74) *Attorney, Agent, or Firm*—Michael E. Belk (57) ABSTRACT

A record carrier has a track pattern of substantially parallel tracks. Control data packs are stored repetitively in several control locations (32) for protection against damage and contamination. The control locations (32) are separated at spacer positions (33) by one or more spacers (34,35). The length of the spacers (34,35) is selected for preventing overlap of the position of the first block of the control data packs in the parallel tracks.

14 Claims, 6 Drawing Sheets

STORING CONTROL INFORMATION USING SPACERS

The invention relates to a method of storing information on a record carrier having a track pattern of substantially parallel tracks for storing the information in blocks and a computer program product for performing the method.

The invention further relates to such a record carrier.

The invention further relates to a device for recording information on such record carrier.

The invention further relates to a device for reading information from such record carrier.

In particular the invention is relevant for the protection against accidental damage of control data stored on a record carrier, i.e. correcting errors resulting from damage or contamination.

Well-known types of record carrier are optical discs like the CD (Compact Disc) and DVD (Digital Versatile Disc), and devices for recording and reading such record carriers are known also. Data storage on the DVD for example is defined in the standard ECMA-267 ($3^{rd}$ edition—April 2001). The information stored on the record carrier can be subdivided in user data, also called main data, and control data for controlling the process of recording and/or reading. Control information is stored on every DVD in a specific area on the disc, for example so-called Physical format information in the Control data zone as described in paragraph 26.5, page 35 of said ECMA-267. An amount of control information for performing a specific function is called a control data pack in this document and is stored or retrieved as a unit. In DVD the Control Data Block contains the Physical format information and is stored repetitively in order to guarantee that a complete and error-free copy can be retrieved from every DVD, even in adverse conditions due to damage or contamination caused by scratches or dirt and dust particles. In DVD the Control Data Block is stored 192 times. A problem of the known method of storing control information is that the relative large number of duplicates requires a large amount of space on the record carrier. Further storing the large number of duplicates requires a long recording time, while retrieving a correct copy of the control information may require a long reading time.

Therefore it is an object of the invention to provide a record carrier and a method and devices for storing and retrieving control information that is robust against errors due to damage or dust, and is efficient in required space and reading time.

According to a first aspect of the invention the object is achieved with a method of storing information as defined in the opening paragraph, the method including storing a control data pack comprising control information on a first control location and storing at least one further control data pack comprising the same control information on at least one further control location in the vicinity of the first control location, while providing at least one spacer that is a track part separating the control locations, and selecting the length of the spacer for preventing substantial overlap of the position of the first block of at least one of the control data packs with the position of the first block of other control data packs in the parallel tracks.

According to a second aspect of the invention the object is achieved with a computer program product for storing information, which program is operative to cause a processor to perform the method.

According to a third aspect of the invention the object is achieved with a device for recording information as defined in the opening paragraph, the record carrier having a track pattern of substantially parallel tracks for storing the information in blocks, the device comprising recording means and a control unit for storing a control data pack comprising control information on a first control location and storing at least one further control data pack comprising the same control information on at least one further control location in the vicinity of the first control location, while providing at least one spacer that is a track part separating the control locations, and for selecting the length of the spacer for preventing substantial overlap of the position of the first block of at least one of the control data packs with the position of the first block of other control data packs in the parallel tracks.

According to a fourth aspect of the invention the object is achieved with a device for reading information as defined in the opening paragraph, the record carrier having a track pattern of substantially parallel tracks for storing the information in blocks, the device comprising reading means and a control unit for retrieving a control data pack comprising control information from a first control location and retrieving at least one further control data pack comprising the same control information from at least one further control location in the vicinity of the first control location, while skipping at least one spacer that is a track part separating the control locations, the spacer having a predetermined length for preventing substantial overlap of the position of the first block of at least one of the control data packs with the position of the first block of other control data packs in the parallel tracks.

According to a fifth aspect of the invention the object is achieved with a record carrier having a track pattern of substantially parallel tracks for storing information in blocks as defined in the opening paragraph, which information includes a control data pack comprising control information on a first control location and at least one further control data pack comprising the same control information on at least one further control location in the vicinity of the first control location, and at least one spacer that is a track part separating the control locations, the length of the spacer preventing substantial overlap of the position of the first block of at least one of the control data packs with the position of the first block of other control data packs in the parallel tracks.

The effect is that a number of duplicates of the control data pack are stored in a limited area while no overlap of corresponding blocks of different duplicates occurs in a direction transverse to the track direction. This has the advantage that even if a specific block of a control data pack in a first control location is damaged, the block can be found in at least a further copy of the same control information in a different control location. The further copy can be written and retrieved in a short time because its storage location is in the vicinity of the storage location of the damaged copy. In spite of its closeness the further copy will not be damaged, at least not in the same block due to the same cause as the first control location.

The invention is also based on the following recognition. An amount of control data needs to be protected against reading errors, in particular against the effects of contamination and scratches. Known solutions rely on repetitively storing the control data packs. The inventors have seen that errors may occur in several duplicates of repetitively stored control data, if such duplicates are aligned in parallel tracks such that corresponding blocks are overlapping. In particular such alignment occurs due to the regularity of storing duplicates of a same length consecutively. By suitably inserting the spacers such regularity is disturbed, and alignment and overlap are prevented. Surprisingly even for a large area of the disc spacers can be selected at a single configuration for storing a number of control data packs together anywhere in said large area. It is to be noted that storing several copies of the control data packs in remote areas of the record carrier is also known, and also prevents damaging all copies at the same time. For example copies of a bad sector table in the DVD+RW system are stored at inner and outer radial areas of the record carrier. However, storing and retrieving control data from such remotely positioned storage locations requires a large amount of access time, and therefore is no viable alternative for storing control data in high performance storage systems.

In an embodiment of the method the control data packs are positioned within an area of the track pattern, the number of blocks in a winding in the area being within a predefined range, and the length of the spacer is selected for preventing said overlap independently of the position of the control data packs within the area. The effect is that a cluster of copies of the control data packs can be stored anywhere within the area of the track pattern, e.g. on a disc-type record carrier between a first radius and a second radius. This has the advantage that uncorrectable errors due to damage and contamination are reduced while the control data pack cluster can be stored anywhere within the area.

In an embodiment of the method the record carrier is a rewritable type record carrier having at least two predefined reserved areas that are reserved for writing a specific control data pack in one of a number of spare control locations for use in a predefined order, and wherein the length of the reserved area is selected such that the remaining spare control locations constitute the spacer. This has the effect that the control data pack can be stored in a number of spare locations, e.g. in the event of wear of a specific location the next spare location can be used. The size of the reserved area results in the stored copies of the control data packs being not aligned.

Further preferred embodiments of the method, devices and record carrier according to the invention are given in the claims.

These and other aspects of the invention will be apparent from and elucidated further with reference to the embodiments described by way of example in the following description and with reference to the accompanying drawings, in which FIG. 7b shows sector alignment of control data packs in reserved areas at 9.3 sectors/winding.

In the Figures, elements which correspond to elements already described have the same reference numerals.

Figures 1A, 1B:
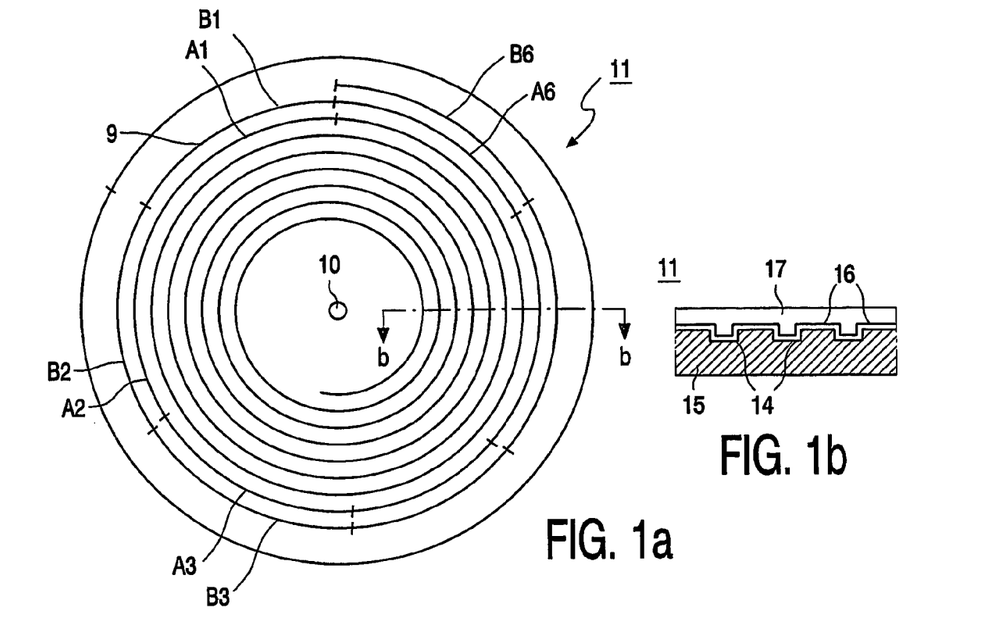
FIG. 1a shows a record carrier and sector alignment (top view)
FIG. 1b shows a record carrier (cross section)

FIG. 1a shows a record carrier and sector alignment. The disc-shaped record carrier 11 has a track 9 and a central hole 10. The track 9, being the position of the series of (to be) recorded marks representing information, is arranged in accordance with a spiral pattern of turns constituting substantially parallel tracks on an information layer. The record carrier may be optically readable, called an optical disc, and has an information layer of read-only or a recordable type. An example of a read-only type is a CD, and examples of a recordable disc are the CD-R and CD-RW, and DVD read-only and writable versions of DVD, such as DVD+RW, and the high density writable optical disc using blue lasers, called Blu-ray Disc (BD). Further details about the DVD disc can be found in reference: ECMA-267: 120 mm DVD—Read-Only Disc—($3^{rd}$ Edition April 2001). The information is represented on the information layer by recording optically detectable marks along the track, e.g. crystalline or amorphous marks in phase change material. The track 9 on the recordable type of record carrier is indicated by a pre-embossed track structure provided during manufacture of the blank record carrier. The track structure comprises position information, e.g. addresses, for indication the location of units of information, usually called information sectors or blocks. The position information includes specific synchronizing marks for locating the start of such information blocks.

FIG. 1b is a cross-section taken along the line b-b of the record carrier 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. A pregroove 14 enables a read/write head to follow the track during scanning. The pregroove for example constitutes the track structure. The pregroove 14 may be implemented as an indentation or an elevation of the substrate 15 material, or as a material property deviating from its surroundings.

The record carrier 11 is intended for carrying any type of digital information, for example in files representing digitally encoded real-time information like LPCM, MP3, or video according to a standardized format like MPEG2.

The information on the disc is stored in blocks or sectors, for example for CD having a size of 2048 user bytes. Such sectors are addressable and retrievable units of information, usually provided with error correcting codes. However, when the number of errors in an area exceeds a predetermined amount, e.g. due to concentrated contamination or scratches in that area, the error correction codes are insufficient and the respective sector cannot be reconstructed. Control data packs that are important for accessing the disc must be retrievable in adverse conditions, e.g. keys for decrypting the content. Hence a number of copies of such control data packs are stored. A problem may occur when the same data is stored in parallel tracks. FIG. 1a illustrates the problem. The number of sectors in a winding of the track is assumed to be 6, whereas the length of a control data pack is also assumed to be 6. A first copy of the control data pack has six sectors A1, A2, A3 to A6. The second copy of the control data pack has six sectors B1, B2, B3 to B6. Corresponding sectors are stored in adjacent parts of the parallel tracks, e.g. first sector A1 of the first copy is neighboring first sector B1 of the second copy. Hence a scratch usually damages the same sector in both copies.

Figure 1C:
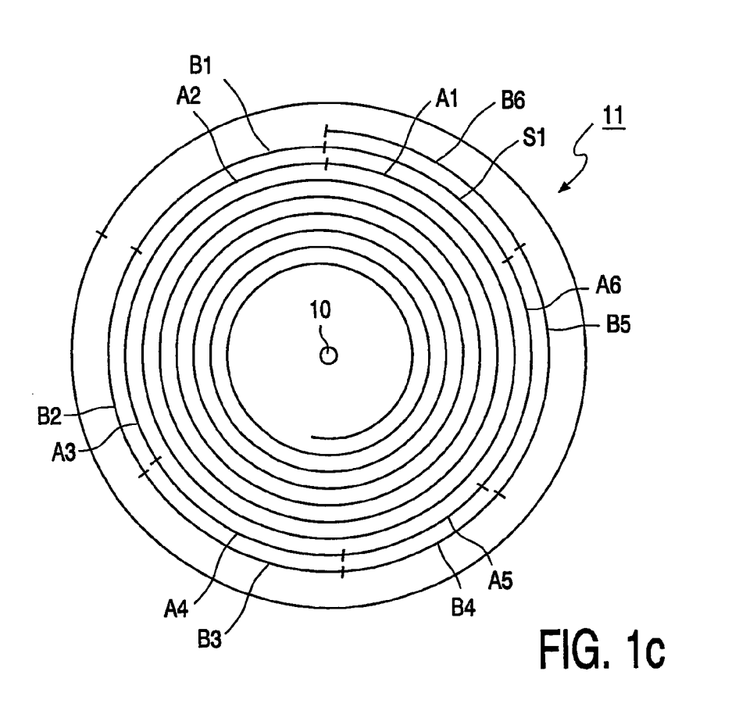
FIG. 1c shows a record carrier and a spacer preventing sector alignment (top view)

FIG. 1c shows a record carrier and a spacer preventing sector alignment. The record carrier 11 has also two copies of a same control data pack like the example shown in FIG.

1A. A first copy of the control data pack has six sectors A1, A2, A3 to A6. The second copy of the control data pack has six sectors B1, B2, B3 to 136. Both copies are separated by a spacer S1 having a size of one sector. Due to the spacer corresponding sectors are stored in different lateral positions of adjacent parallel tracks. Hence a scratch usually damages different sectors in each copy, and a reconstruction of the control information is possible using undamaged sectors of both copies. A method of storing information and selecting the size of the spacer or spacers is explained in detail for the CD system below.

Figure 2:
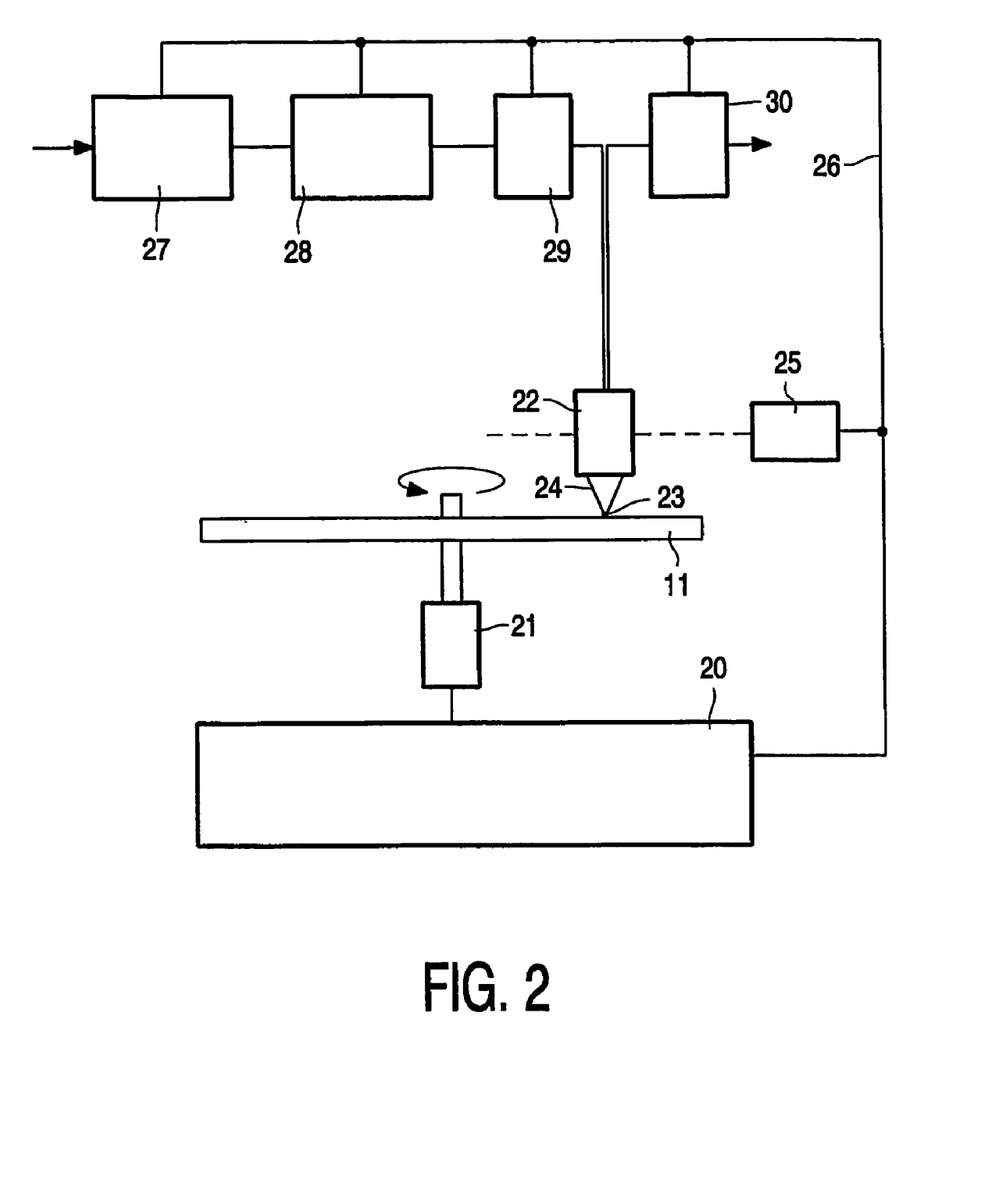
FIG. 2 shows a recording device.

FIG. 2 shows a recording device for writing information on a record carrier 11 of a type which is writable or re-writable, for example CD-R or CD-RW, or DVD+RW or BD. The device is provided with recording means for scanning the track on the record carrier which means include a drive unit 21 for rotating the record carrier 11, a head 22, a positioning unit 25 for coarsely positioning the head 22 in the radial direction on the track. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. For writing information the radiation is controlled to create optically detectable marks in the recording layer. For reading the radiation reflected by the information layer is detected by a detector of a usual type, e.g. a four-quadrant diode, in the head 22 for generating a read signal and further detector signals including a tracking error and a focusing error signal for controlling said tracking and focusing actuators. The read signal is processed by read unit 30 of a usual type including a demodulator, deformatter and output unit to retrieve the information. Hence reading means for reading information include the drive unit 21, the head 22, the positioning unit 25 and the read unit 30. The recording means further include means for processing the input information to generate a write signal to drive the head 22, which means comprise an input unit 27, and a formatter 28 and a write unit 29. A control unit 20 controls the recording and retrieving of information and may be arranged for receiving commands from a user or from a host computer. The control unit 20 is connected via control lines 26, e.g. a system bus, to said input unit 27, formatter 28 and write unit 29, to the read unit 30, and to the drive unit 21, and the positioning unit 25. The control unit 20 comprises control circuitry, for example a microprocessor, a program memory and control gates, for performing the procedures and functions according to the invention as described below. The control unit 20 may also be implemented as a state machine in logic circuits. The input unit 27 receives the user real-time information and processes the audio and/or video to blocks of information, which are passed to the formatter 28 for adding control data and formatting the data according to the file format of the specific type of data, e.g. MP3 audio data Real-time data may also be already formatted according to the file format, e.g. from a computer application or a copy of real-time information recorded on a different device, and may be interfaced to the formatter 28 directly. The formatted data from the output of the formatter 28 is passed to the write unit 29, which comprises for example a channel coder, for generating a modulated signal which drives the head 22. Further the write unit 29 comprises synchronizing means for including synchronizing patterns in the modulated signal. The formatted units presented to the input of the modulation unit 29 comprise address information and are written to corresponding addressable locations on the record carrier under the control of control unit 20. During the writing operation, marks representing the information are formed on the record carrier. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material. Writing and reading of information for recording on optical disks and usable formatting, error correcting and channel coding rules are well-known in the art, e.g. from the CD system. The marks can be formed by means of the spot 23 generated on the recording layer via the beam 24 of electromagnetic radiation, usually from a laser diode. In an embodiment the input unit 27 comprises compression means for input signals such as analog audio and/or video, or digital uncompressed audio/video. Suitable compression means are described for video in the MPEG standards, MPEG-1 is defined in ISO/IEC 11172 and MPEG-2 is defined in ISO/IEC 13818. The input signal may alternatively be already encoded according to such standards.

The control unit 20 is arranged for controlling the recording means for storing control information that is to be protected against damage and contamination of the record carrier as follows. Storing the control information in the way indicated makes the information robust against the adverse effects. First a control data pack comprising the control information is composed. Then the control data pack is stored on a first control location and at least one further copy of the control data pack comprising the same control information is stored on at least one further control location in the vicinity of the first control location. Some open space is provided separating the control locations. The open space, called a spacer, is a track part that is in between control locations, but does not contain the control information that is to be protected. It is noted that the spacer may be empty (unrecorded), filled with dummy data (e.g. all zeroes) or may contain other data, such as control information that is less critical and needs no special robustness. The length of the spacer is selected for preventing substantial overlap of the position of the first block of at least one of the control data packs with the position of the first block of other control data packs in the parallel tracks. The process of selecting the length of the spacer or spacers for the CD system is described below in detail. It is noted that the length selected may be calculated beforehand for a specific recording system, and one or more spacer lengths can be selected from a predefined table in the control unit in dependence of practical parameters, e.g. the type of record carrier or the logical address indicating the approximate radial position of recording. It is noted that the location of the duplicates can be recorded in further control data that is not duplicated, and hence the spacers used need not be constant.

The device as shown in FIG. 2 further has a read-out function for reproducing data. Thereto the read unit 30 is coupled to the head 22 for receiving the data. The control unit is arranged for retrieving the control data packs from the control locations as follows. A first attempt is made to read the control data pack at the first control location. If the data contains uncorrectable errors, further control location(s)

is/are read, while skipping the spacer(s), until a control data pack is read without errors. In an embodiment of the device the control unit is provided with error correction means for correcting errors in the control information based on a combination of at least two control data packs. Thereto the control unit makes a combination of control information from control data packs read from different control locations, e.g. combining sectors without errors from both locations.

A read device without recording function has the same elements as the recording device shown in FIG. 2 except the input unit 27, formatter 28, write unit 29 and recording control elements of the control unit.

In an embodiment of the devices part of the control unit 20 for performing the storing and/or reading of control data is implemented by a computer program running on a processor. In an embodiment the computer program is for running on the processor of a personal computer, e.g. as a SW device driver.

In an extension of the CD system, called CD2 in this document, the following is distinguished: medium types (CD-ROM, CD-R, CD-RW), format types (CD2RO, CD2R, CD2RW) and access types (read-only, write-once, rewritable). The medium type is the nature of the physical medium, the format type is the way the data is formatted, e.g. the volume structure, and the access type is the way the data can be accessed. For instance, the access type may be read-only for the format type CD2RO and CD2R, while these format types can be present on various media types, e.g. CD-RW. The write-once access type for format type CD2R can be present on both CD-R and CD-RW media types, but not on the CD-ROM. Further the CD2 system comprises a set of specifications delivering secure storage on CD.

In the CD2 system the selection of spacer(s) is as follows. The CD2 system requires control information to be stored robustly in a dedicated drive data area (DDA) on disc, which data is used by the drive to determine in part the behavior of a disc. In particular in the CD2 system the DDA is called the key locker area (KLA), because most of it is used to store keys for accessing the main data in a so-called the key locker (KL). The KL is a structure that contains the rights definitions and keys to access assets on the CD that are protected by the CD2 system. A further description of the key locker is given in WO02/15184. For reasons of robustness identical versions of the KL are recorded in the KLA. Each KL is sector by sector identical to all other duplicates. In the event of uncorrectable errors in a first version a next identical version can be retrieved, or a combination of versions may be used.

There are three basic types of damage that are typical for optical record carriers like CD: scratches along the radius, scratches along the circumference and spots. Traditionally to avoid that a single scratch can take out multiple instances of the data, duplicates were stored on locations physically apart, e.g. one on the inside of the disc in the lead-in (LI) and one on the outside of the disc in the lead-out (LO). If the duplicate in the LI is damaged and the duplicate in the LO needs to be read, the access time of the disc increased significantly, as additional time is needed to jump back and forth between the LI and the LO. On the other hand, if all duplicates are stored in the LI, they are physically close together, which makes them more susceptible to concurrent damage. For instance, a scratch that damages one KL duplicate will almost certainly damage other KL duplicates. Note that if the first sectors of the duplicates align, all sectors align and the vulnerability for scratches spans the circumference of the disc. According to the invention the solution is store the duplicates in storage locations that are located together but to avoid sector alignment by inserting spacers, thereby preventing one radial scratch damaging the same data in all KL duplicates.

Figure 3:
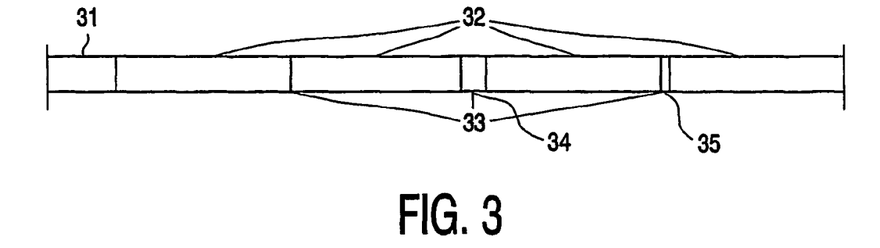
FIG. 3 shows storage locations and spacers.

FIG. 3 shows storage locations and spacers. Schematically a part of the track is shown having a first part 31 for storing information that needs no special robustness against damage. Thereafter the track has 4 storage locations 32 of equal size for storing duplicates of control data packs containing control information that needs robustness. In between the storage locations 3 spacer locations 33 are indicated, the second having a spacer 34 and the third having a spacer 35. Note that it is not useful to insert more than two spacers as this would effectively mean that the space reserved for the duplicate data is increased by the size of the smallest spacer. If the duplicate control data packs are smaller than the space reserved for them, the remainder of the reserved space will remain empty.

Figure 4A:
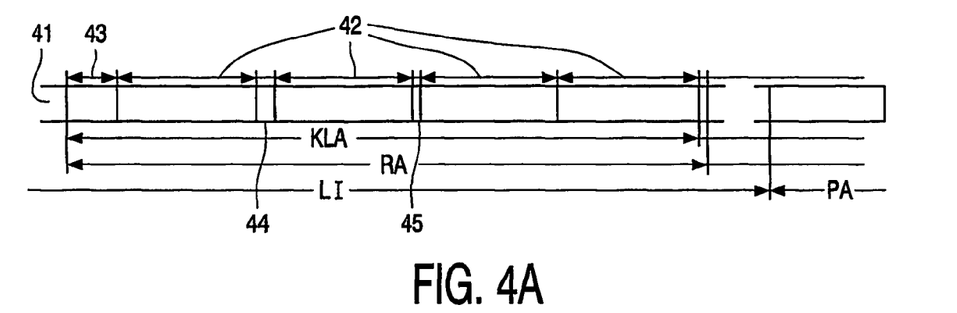
FIG. 4a shows storage locations for the CD2 system.

FIG. 4a shows storage locations for the CD2 system. Schematically a part 41 of the track is shown having a first part 43 for storing basic control information that needs no special robustness against damage. Thereafter the track has 4 storage locations 42 of equal size for storing the duplicates of control data packs containing control information that needs robustness. In between the storage locations a first spacer 44 and a second spacer 45 are located. The total reserved area RA contains the key locker area KLA for the key locker storage. A session on CD is an annular area on disc consisting of a lead-in area LI, a program area PA and a lead-out area LO. A single session CD just has one session, whereas a multi-session disc has a number of consecutive sessions. The LI contains the table of content (TOC) for the volume, the whole of the PA is in principle (apart from possibly a pre gap and post gap) available for user data in one or more tracks and the LO contains empty blocks. The reserved area RA is located in the lead-in LI before the program area PA on the CD. On read-only format type CD2RO and finalized recordable format type CD2R discs the space reserved for the KLA is defined as an area of 374 sectors. The reserved area RA for the KLA is located in the lead-in of the CD2 session, starting at [(start PA)−35"] and continuing for 5 seconds (375 sectors).

Figure 4B:
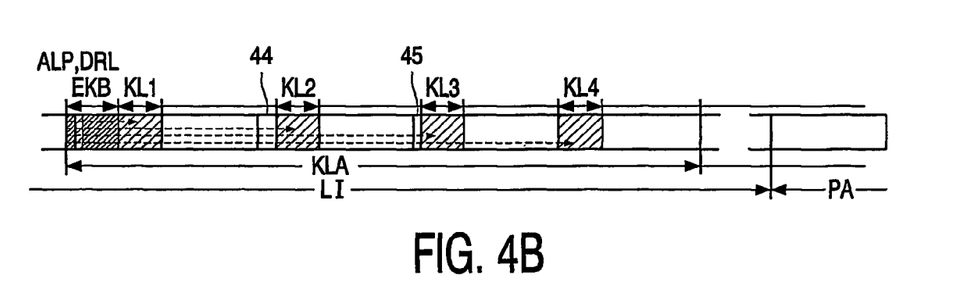
FIG. 4b shows control data packs in the storage locations.

FIG. 4b shows control data packs in the storage locations. The same track areas as shown in FIG. 4a are present. The first part 43 spans sector 1 till 32, and contains the Adaptation Layer Parameter space (ALP) and some additional basic control information called DRL (device revocation list, also known as BL or black list) and EKB (enabling key block). The physical sector numbers of the control locations are recorded in the ALP indicated by dashed arrows in the Figure. The control locations 42 are occupied by 4 duplicates of the key locker control data packs, KL1, KL2, KL3 and KL4, the control locations respectively spanning sectors 33 till 116, 121 till 204, 207 till 290 and 291 till 374. The first spacer consisting of 4 empty sectors spans sectors 117 till 120, the second spacer consisting of 2 empty sectors spans sectors 205 and 206. Hence the record carrier contains four identical instances of the KL. The maximum size of each KL instance is 168 KB (84 sectors).

Figure 6A:
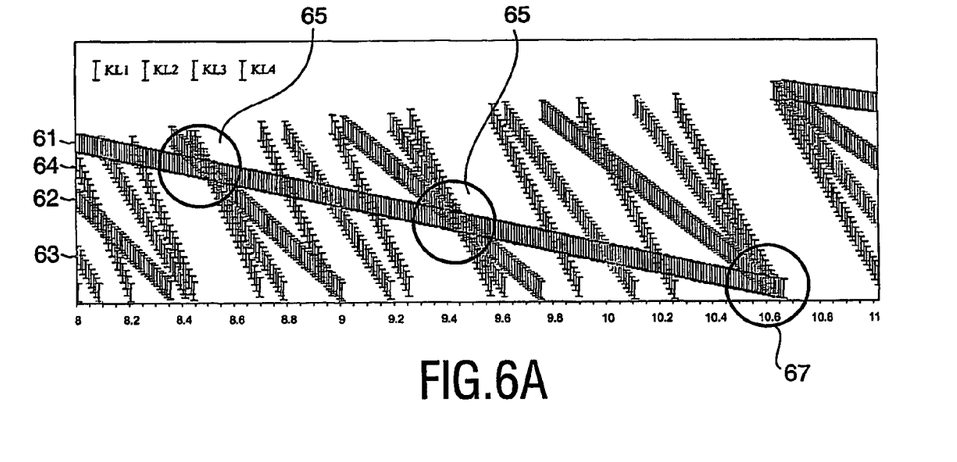
FIG. 6a shows sector alignment of control data packs without spacers.
Figure 6B:
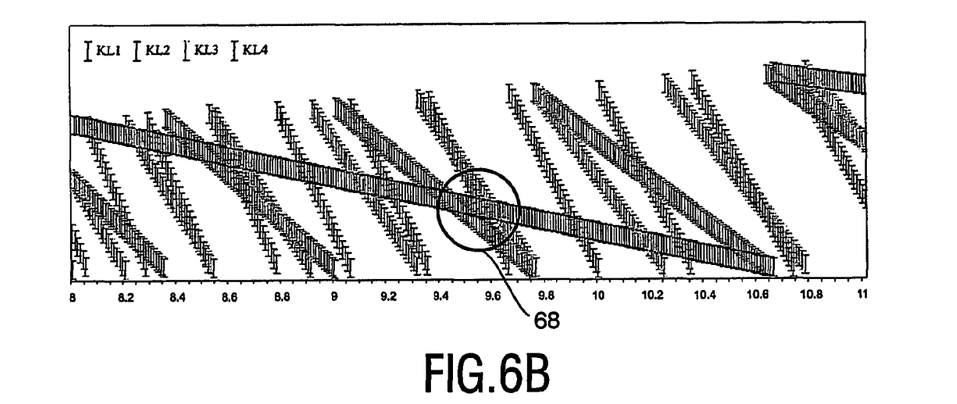
FIG. 6b shows sector alignment of control data packs with spacers in 0:3:0 configuration.
Figure 6C:
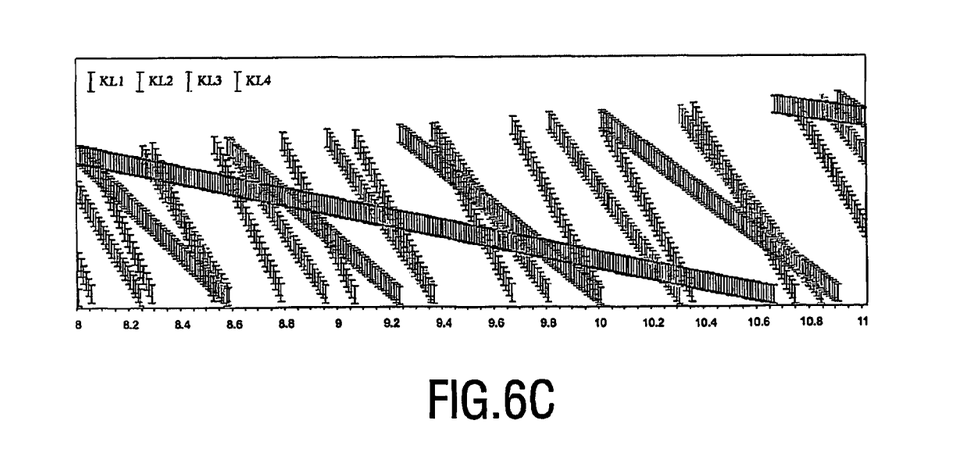
FIG. 6c shows sector alignment of control data packs with spacers in 4:2:0 configuration.

For the 'read-only' access type (the pressed type CD2RO and finalized recordable type CD2R) the KLA is located in the LI. For a rewritable type CD2RW the key KLA is on a fixed location in the LI. In an embodiment for the CD2RO and CD2R formats the physical location of the LI containing the KLA is not fixed. The LI is at the start of a session in a multi-session disc, which can be located at the beginning of the disc or near the outer edge of the disc or anywhere in between. The spacers are selected such that no alignment occurs for the whole range of positions as explained in detail with reference to FIG. 6.

Figure 5:
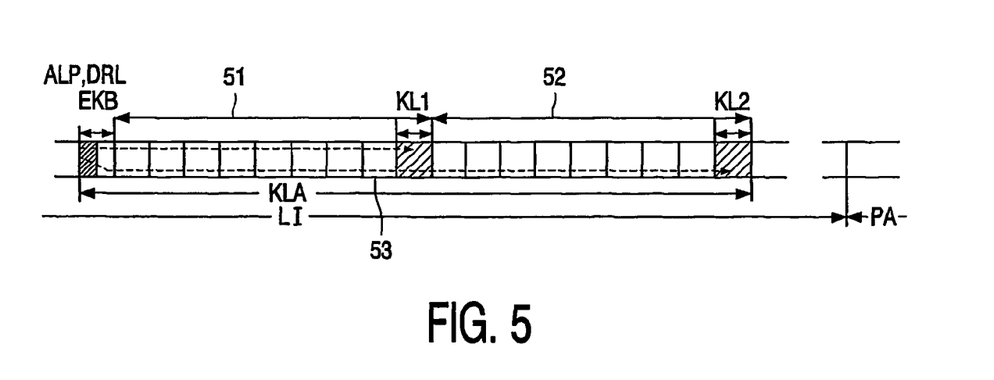
FIG. 5 shows storage locations on a rewritable record carrier.

FIG. 5 shows storage locations on a rewritable record carrier. The KLA is located in the LI before the PA similar to FIG. 4. The rewritable type record carrier has two predefined reserved areas 51, 52 that are reserved for writing a specific control data pack, such as the key locker KL1, KL2, in one of a number of spare control locations 53. The spare control locations are to be used in a predefined order, e.g. starting with the highest address in the reserved area and going downwards. The length of the reserved areas 51,52 is selected such that the remaining spare control locations constitute the spacer to avoid sector alignment, as explained in detail with FIGS. 7*a* and 7*b*.

FIG. 6*a* shows sector alignment of control data packs without spacers. The positions of the first sector in a winding of the duplicate control data packs are shown vertically on the y-axis, for a range of sectors in a winding horizontally on the x-axis. The first positions of KL1 for the range constitute a slanted band 61 in the Figure, while the first positions of KL2,KL3,K14 correspond to the further slanted areas 62, 63 and 64 respectively. No spacers are used, and full sector alignment is inevitable for certain zones on disc. The figure shows three such alignment zones 65, 66, 67 where all slanted bands cross. Such alignment zones indicate that for that value of sectors/winding all 4 duplicates have their respective first sectors at the same angular position. Without spacers there are seven such zones on the whole CD.

To determine which spacer configuration would be optimal for the CD2 system, the relative positions of the first sectors of each duplicate for all positions between the inside and the outside of the disc are compared for several spacer configurations. Note that a 'sector per winding' value of around 9.4 is typical in the lead in of a single session disc up to around 25 in the lead-out. The Figures show only the first part of the sectors per winding range. Note that the highest y-values in the FIGS. 6*a,b,c* connect to the bottom line of the next x-value.

FIG. 6*b* shows sector alignment of control data packs with spacers in 0:3:0 configuration. There are 3 sectors used for spacers and 85 sectors for each KL duplicate. The Figure shows the alignment for a 0:3:0, which means that the first and third spacers have size zero and the second is 3 sectors in size. The vulnerability to scratches is decreased significantly. There is no location on disc anymore where full sector alignment occurs, only a partial alignment in zone 68 occurs, and further partial overlap occurs near x=8.65 and x=10.85. Hence the 3 sector spacer results in reduced sector overlap in the given range of sectors/winding. Moreover, the 0:3:0 is the configuration that limits the sector overlap the most, when only three sectors are available for the spacers.

FIG. 6*c* shows sector alignment of control data packs with spacers in 4:2:0 configuration. The 4:2:0 configuration results in no overlap. No further reduction can be achieved, even when more than 7 sectors are available for the spacers.

Figure 7A:
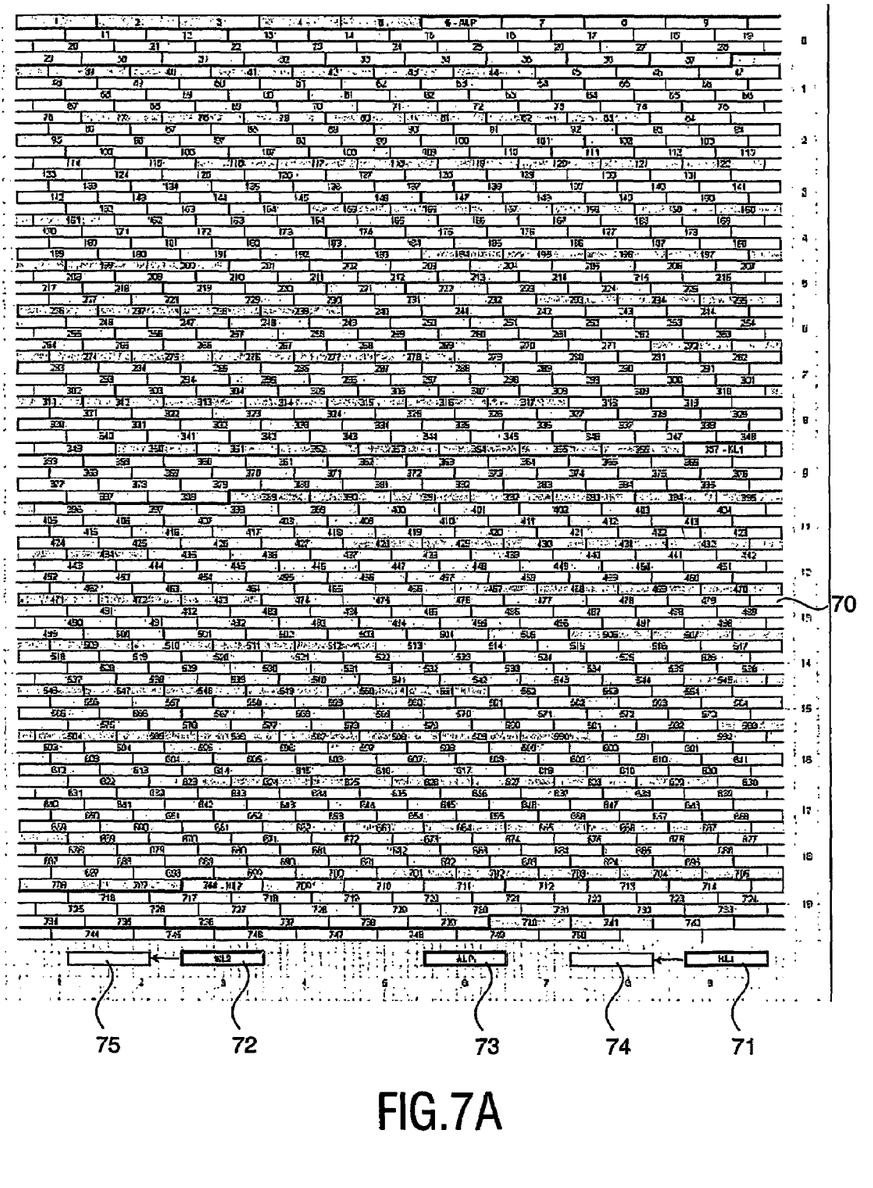
FIG. 7a shows sector alignment of control data packs in reserved areas at 9.4 sectors/winding.

FIG. 7*a* shows sector alignment of control data packs in reserved areas at 9.4 sectors/winding, specifically for the CD2RW format. A sector map 70 for the KLA is shown at a 'sector per winding' value of 9.4. The dark gray sectors, e.g. 1 to 5 and 77 to 83, indicate run-in, run-out and linking blocks that are not used for storing data. The KLA has a two KL duplicates, each of them located in a reserved area as explained above with reference to FIG. 5. Relative to the start of the sector map 70 KL1 starts at sector 357, and KL2 at sector 708. The bottom part of the Figure shows the projected relative positions 71,72 of the first sectors of the KL1, KL2 and position 73 of the ALP. Clearly no alignment occurs. Further the positions 74 and 75 are shown for the event that KL1 and KL2 are relocated, e.g. because the original location are worn out. The 'sector per winding' value of 9.4 is based on practical assumptions, e.g. the duration of a sector is $1/75$ seconds=13.33 ms and the linear recording speed is 1.2 m/s. It follows for the given position of the KLA in the LI (between 23.75 and 24.0 mm) that the number of sector per winding(=circumference/(duration sector*linear velocity) is between:

$$(2*pi*24.0 \text{ mm})/(13.33 \text{ ms}*1.2 \text{ m/s})=9.4 \text{ sectors/}wdg, \text{ and} \quad (1)$$

$$(2*pi*23.75 \text{ mm})/(13.33 \text{ ms}*1.2 \text{ m/s})=9.3 \text{ sectors/}wdg. \quad (2)$$

FIG. 7*b* shows sector alignment of control data packs in reserved areas at 9.3 sectors/winding, specifically for the CD2RW format. Similar to FIG. 7*a* the sector map and alignment are shown. Note that KL1 after relocation partially overlaps the original location of KL2. Given the practical requirements no better size for the reserved area could be selected. However the alignment disappears as soon as KL2 is also relocated. In an embodiment the relocation of KL1 and KL2 is coupled, i.e. as soon as one of the original locations is worn out both KL1 and KL2 are relocated. Hence no alignment of first and second generation locations occurs.

Although the invention has been mainly explained by embodiments using optical discs, the invention is also suitable for cards having straight parallel tracks or other record carriers such as magnetic discs. It is noted, that in this document the verb 'comprise' and its conjugations do not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software. Further, the scope of the invention is not limited to the embodiments, and the invention lies in each and every novel feature or combination of features described above.

The invention claimed is:

1. Method of storing information on a record carrier having a track pattern of substantially parallel tracks for storing the information in blocks, the method including storing a control data pack comprising control information on a first control location and storing at least one further control data pack comprising the same control information on at least one further control location in the vicinity of the first control location, while providing at least one spacer that is a track part separating the control locations, and selecting the length of the spacer for preventing substantial overlap of the position of the first block of at least one of the control data packs with the position of the first block of other control data packs in the parallel tracks.

2. Method as claimed in claim 1, wherein the record carrier is a disc-type record carrier having a circular or spiral shaped track pattern of tracks that accommodate a number of blocks in a winding.

3. Method as claimed in claim 2, wherein the control data packs are positioned within an area of the track pattern, the number of blocks in a winding in the area being within a predefined range, and wherein the length of the spacer is selected for preventing said overlap independently of the position of the control data packs within the area.

4. Method as claimed in claim 3, wherein the length of the control data packs is n blocks, and four instances of the control data packs are consecutively stored, and the length of the spacer between the first and the second instance is selected to be s1 blocks, and the length of the spacer between the second and the third instance is selected to be s2 blocks, and the length of the spacer between the third and the fourth instance is selected to be s3 blocks, in particular n=84, s1=4, s2=2, s3=0 or n=85, s1=0, s2=3, s3=0.

5. Method as claimed in claim 1, wherein the record carrier is a rewritable type record carrier having at least two predefined reserved areas that are reserved for writing a specific control data pack in one of a number of spare control locations for use in a predefined order, and wherein the length of the reserved area is selected such that the remaining spare control locations constitute the spacer.

6. Method as claimed in claim 5, wherein the length of the reserved area is selected such that the remaining spare control locations constitute the spacer for the event that the specific control data packs are written in corresponding spare control locations, and for the event that the specific control data pack in a first reserved area is written in a first spare control location and a same specific control data pack in a further reserved area is written in a second spare control location, the first and second spare control locations being consecutive in said predefined order.

7. Method as claimed in claim 5, wherein the length of a spare control location is n+k blocks, n being a number of control data blocks and k being linking blocks between data blocks, and the length of the reserved area is r*(n+k) blocks, in particular n=32, k=7 and r=9.

8. Computer readable medium encoded with a data structure for storing information, which program is operative to cause a processor to perform the method as claimed in claim 1.

9. Device for recording information on a record carrier, the record carrier having a track pattern of substantially parallel tracks for storing the information in blocks, the device comprising recording means and a control unit for storing a control data pack comprising control information on a first control location and storing at least one further control data pack comprising the same control information on at least one further control location in the vicinity of the first control location, while providing at least one spacer that is a track part separating the control locations, and for selecting the length of the spacer for preventing substantial overlap of the position of the first block of at least one of the control data packs with the position of the first block of other control data packs in the parallel tracks.

10. Device for reading information from a record carrier, the record carrier having a track pattern of substantially parallel tracks for storing the information in blocks, the device comprising reading means and a control unit for retrieving a control data pack comprising control information from a first control location and retrieving at least one further control data pack comprising the same control information from at least one further control location in the vicinity of the first control location, while skipping at least one spacer that is a track part separating the control locations, the spacer having a predetermined length for preventing substantial overlap of the position of the first block of at least one of the control data packs with the position of the first block of other control data packs in the parallel tracks.

11. Device as claimed in claim 10, wherein the control unit is provided with error correction means for correcting errors in the control information based on a combination of at least two control data packs.

12. Record carrier having a track pattern of substantially parallel tracks for storing information in blocks, which information includes a control data pack comprising control information on a first control location and at least one further control data pack comprising the same control information on at least one further control location in the vicinity of the first control location, and at least one spacer that is a track part separating the control locations, the length of the spacer preventing substantial overlap of the position of the first block of at least one of the control data packs with the position of the first block of other control data packs in the parallel tracks.

13. Record carrier as claimed in claim 12, wherein the record carrier is a disc-type record carrier having a circular or spiral shaped track pattern of tracks that accommodate a number of blocks in a winding, and wherein the control data packs are positioned within an area of the track pattern, and the number of blocks in a winding in the area being within a predefined range, and wherein the length of the spacer is selected for preventing said overlap independently of the position of the control data packs within the area.

14. Record carrier as claimed in claim 13, wherein the length of the control data packs is n blocks, and four instances of the control data packs are consecutively stored, and the length of the spacer between the first and the second instance is selected to be s1 blocks, and the length of the spacer between the second and the third instance is selected to be s2 blocks, and the length of the spacer between the third and the fourth instance is selected to be s3 blocks, in particular n=84, s1=4, s2=2, s3=0 or n=85, s1=0, s2=3, s3=0.

* * * * *